United States Patent [19]

Conrad et al.

[11] Patent Number: 4,697,423
[45] Date of Patent: Oct. 6, 1987

[54] CONNECTING LINE BETWEEN A COMPRESSOR OF AN EXHAUST GAS TURBOCHARGER FLANGEDLY CONNECTED AT AN EXHAUST GAS MANIFOLD OF AN INTERNAL COMBUSTION ENGINE AND A SUCTION PIPE

[75] Inventors: Ulrich Conrad, Ludwigsburg; Michael Grohn, Waiblingen; Peter Moser, Weinstadt, all of Fed. Rep. of Germany

[73] Assignee: Daimler-Benz Aktiengesellschaft, Stuttgart, Fed. Rep. of Germany

[21] Appl. No.: 897,074

[22] Filed: Aug. 18, 1986

[30] Foreign Application Priority Data

Aug. 17, 1985 [DE] Fed. Rep. of Germany ....... 3529543

[51] Int. Cl.⁴ ............................................ F02B 37/00
[52] U.S. Cl. ...................................... 60/605; 285/370
[58] Field of Search .......................... 60/605; 123/559; 285/370, 397

[56] References Cited

U.S. PATENT DOCUMENTS 4,559,783 12/1985 Ampferer ............................... 60/605

FOREIGN PATENT DOCUMENTS 521396 8/1957 Italy ..................................... 285/370

Primary Examiner—Michael Koczo
Attorney, Agent, or Firm—Barnes & Thornburg

[57] ABSTRACT

A connecting line between a compressor of an exhaust gas turbocharger flangedly connected at the exhaust gas manifold of an internal combustion engine and a suction pipe which consists of a first line part secured at the suction pipe and of a second line part which is coupled with the exhaust gas turbocharger by way of plug-in coupling sections and with the first line part by way of a line bridge fixed at the engine and provided with plug-in coupling sections. The line bridge encloses a mixing space between its coupling sections, in which exhaust gases controlled by an exhaust gas valve are fed to the through-flowing charging air.

16 Claims, 1 Drawing Figure

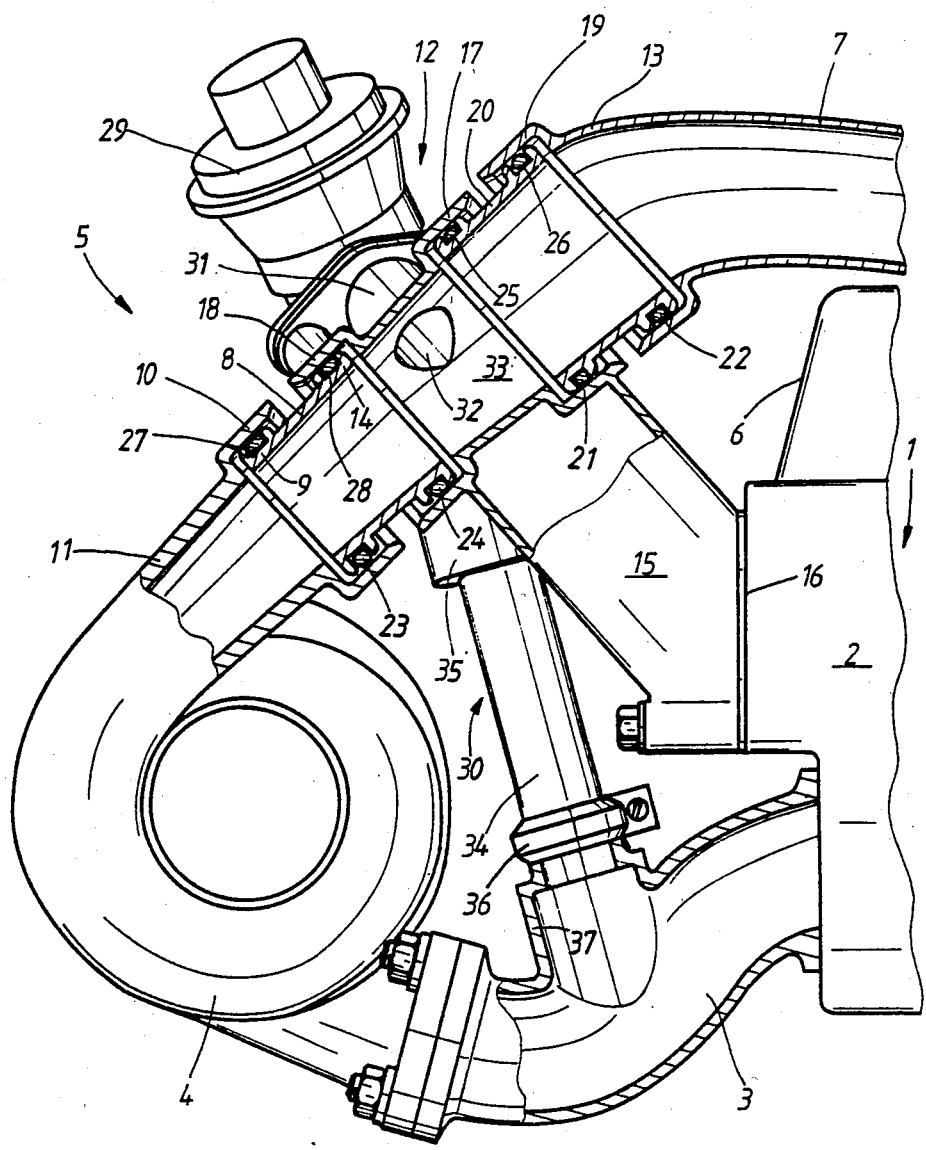

CONNECTING LINE BETWEEN A COMPRESSOR OF AN EXHAUST GAS TURBOCHARGER FLANGEDLY CONNECTED AT AN EXHAUST GAS MANIFOLD OF AN INTERNAL COMBUSTION ENGINE AND A SUCTION PIPE

The present invention relates to a connecting line between a compressor of an exhaust gas turbocharger flangedly connected to the exhaust gas manifold of an internal combustion engine and a suction pipe, and more particularly to a connecting line assembled of two line sections.

A connecting line assembled of two line sections is disclosed in the German Pat. No. 32 17 633. Both line sections are thereby fitted one within the other by way of coupling sections at the pipe ends in a manner to compensate for angles and tolerances. In a similar manner, the compressor outlet is also connected by way of coupling sections with the compressor-side end of the second line section. In order to avoid vibrations within the connecting area between the two line parts, the coupling sections which are fitted, one within the other, are additionally secured by two sheet metal shells bridging the sections and clamped fast at the pipe parts. Therebeyond, the first line section is secured at the valve cover by means of pipe clamps.

It is thereby of disadvantage that the connecting area between two line sections is so fixed by the two sheet metal shells that an unconstrained, free compensation of tolerances and heat stresses is not possible. Added thereto is the fact that as a result of the fastening of the first line part at the valve cover, stresses occurring as a consequence of thermal expansions in the suction system are conducted into the valve cover by way of the pipe clamps. This is true also for the enormous heat expansions occurring within the area for the exhaust gas turbocharger which lead to an additional stress of the valve cover by reason of the limited compensation possibility in the connecting area of the two line parts. Finally, this connecting line further entails the disadvantage that no measures are provided for an exhaust gas recirculation.

The present invention is therefore concerned with the task to improve the known connecting line in such a manner that in addition to a simplification in the assembly an unconstrained compensation of thermal expansions and manufacturing tolerances between the two line parts and an undisturbed recirculation of exhaust gases into the combustion air is achieved.

The underlying problems are solved according to the present invention in that a line bridge fixed at the internal combustion engine is arranged between the first and second line part which includes at its longitudinal pipe discharge ends coupling sections for separately receiving the coupling sections on both line parts and which includes between the two coupling sections a mixing space with an overflow opening for the admixture of exhaust gas to the combustion air.

The line bridge according to the present invention represents a connecting member on which the two line sections are retained separately from one another and thus decoupled from a vibration point of view. Additionally, it is achieved thereby that differing thermal expansions as well as manufacturing tolerances between the part on the suction pipe side and the part on the exhaust gas side of the connecting line are compensated far-reachingly automatically without mutual influence.

By the locally fixed attachment of the line bridge at the engine, the connecting line includes a line section fixed at the engine which is suitable in particular for a vibration-free arrangement of an exhaust gas recirculating valve. As the line parts are merely plugged in or inserted at the coupling sections of the line bridge, a rapid and simple assembly of the connecting line is possible.

According to another feature of the present invention, the coupling sections of the line bridge are constructed as pipe sockets while the pipe ends of the compressor outlet and of the first line section which are also constructed as pipe sockets are disposed axially opposite the pipe sockets of the line bridge coupling sections with an axial spacing while the pipe sockets disposed adjacent one another are coupled with one another by an inserted connecting sleeve, of which the connecting sleeve between the compressor outlet and the line bridge forms the second line part. The line sleeves may be provided at their longitudinal ends with sealing rings which abut against the inner wall of the pipe sockets. In addition to a simple assembly and a tight connection of all of the line parts, the possibility is achieved by the construction of the coupling sections in the manner described above for the compensation of a lateral offset between the line parts.

An advantageous arrangement of the line bridge at the engine is achieved if the line bridge is secured at the longitudinal wall of the engine housing at the exhaust side by way of a bracket.

It is possible to arrange the exhaust gas recirculation valve not only vibration-free but also at a relatively cool place of the connecting line if, according to a further feature of the present invention, the overflow opening forms the ends of a hollow flange connection formed on the housing of the mixing space on which is secured an exhaust gas recirculating valve.

A good through-mixing of charging air and exhaust gas and a good pressure build-up in the connecting line is achieved according to the present invention if the flange connection is arranged tangentially to the mixing space and obliquely to the exhaust flow direction of the charging air at the housing thereof and if, starting from the compressor outlet, the line cross section of the two connecting sleeves and of the line bridge are constructed enlarged in a diffusor-like manner.

A structurally simple connection of the exhaust gas recirculating valve and exhaust gas manifold can be achieved according to the present invention if the exhaust gas recirculating valve is connected by way of a flow line with a pipe connection at the exhaust gas manifold and if the flow line is assembled of a fixed pipe section and of a bellows pipe whereby the fixed pipe section is secured at the pipe connection by means of a clamp and the bellows pipe at the exhaust gas recirculating valve by means of a clamp.

These and other objects, features and advantages of the present invention will become more apparent from the following description when taken in connection with the accompanying drawing which shows, for purposes of illustration only, one embodiment in accordance with the present invention, and wherein:

The single FIGURE is an elevational view, partly in cross section, of a connecting line between a compressor of an exhaust gas turbocharger and a suction pipe in accordance with the present invention.

Referring now to the single FIGURE of the drawing, an exhaust gas manifold 3 is secured on an internal combustion engine, only partly illustrated and generally designated by reference numeral 1, at the exhaust side of the cylinder head 2; an exhaust gas turbocharger 4 is flangedly connected to the exhaust manifold 3. The charging air supplied by the compressor of the exhaust gas turbocharger 4 is conducted by way of a connecting line generally designated by reference numeral 5 to a suction pipe (not shown) arranged on the opposite side of the cylinder head. The connecting line 5 which thereby leads over the valve cover 6 includes a first line part 7 secure at the suction pipe, a second line part 8 which is inserted with a coupling section 9 in a coupling section of the compressor outlet 11 constructed as pipe socket 10 and of a line bridge generally designated by reference numeral 12, by means of which the two manually facing line ends 13 and 14 of the line parts 7 and 8 are coupled with each other.

The line bridge 12 is fixedly supported at the exhaust-side longitudinal wall 16 of the engine housing by way of a bracket 15. For receiving the two line ends 13 and 14, the longitudinal ends of the line bridge 12 are constructed as pipe sockets 17 and 18; the line end 13 of the first line part 7 constructed as pipe socket 19 and by reason of the structurally near arrangement of the exhaust gas turbocharger to the line bridge 12, the pipe socket 10 of the compressor outlet 11 are disposed opposite the pipe sockets 17 and 18 with an axial spacing. The coupling of the mutually oppositely disposed pipe sockets 17 and 19 takes place by an inserted connecting sleeve 20 and between the pipe sockets 10 and 18 by the second line part 8 constructed at the same time as connecting sleeve which is plugged together with its line end 14 into the pipe socket 18. With an arrangement of the exhaust gas turbocharger 4 remote from the line bridge 12, the connecting sleeve used as second line part can be correspondingly lengthened, or a separate matched line part can be inserted which is coupled with the line bridge 12 in the same manner as the line part 7.

The connecting sleeves 8 and 20 thus form together with the pipe sockets 10, 18, respectively, 17, 19 simple plug-in couplings by means of which the line parts 7 and 8 are retained separately at the line bridge 12. Thermal expansions and manufacturing tolerances which occur at the individual line parts 7 and 8 are compensated for by the two connecting sleeves 18 and 20 without mutual interference.

In order that no charging air can escape to the outside at the coupling sections, sealing rings 21, 22, respectively, 23, 24 are arranged at the ends of the connecting sleeves 8 and 20 which are retained in annular grooves 25, 26, respectively, 27, 28 and abut each at the inside of the respective socket.

For reducing the harmful components in the exhaust gas, the engine is equipped with an exhaust gas recirculation arranged at the connecting line 5. The exhaust gas recirculation includes an exhaust gas recirculation valve 29 and a flow line generally designated by reference numeral 30 leading from the recirculating valve 29 to the exhaust gas manifold 3. In order to that the exhaust gas recirculating valve 29 cannot be subjected to loads either by line vibrations or by different thermal expansions, respectively, tolerances, the exhaust gas recirculating valve 29 is arranged at the line bridge 12 fixed at the engine. For that purpose a hollow flange connection 31 is formed on the housing of the line bridge 12 between the pipe sockets 17 and 18 on which is flangedly connected the exhaust gas recirculating valve 29. The flange connection 31 includes an overflow opening 32 discharging in the housing whereby the line section delimited by the housing forms a separate mixing space 33 in the connecting line. In order that a good mixing of exhaust gas and charging air is achieved in the mixing space, the flange connection 31 is arranged at the housing of the line bridge 12 tangentially to the mixing space 33 and obliquely in the flow direction of the charging air. The flow line 30 consists of a fixed pipe section 34 and of a bellows pipe 35 for the compensation of thermal expansions. The fixed pipe section 34 is thereby secured by means of a clamp 36 at the pipe connection 34 formed on the exhaust gas manifold 3 and the bellows pipe is secured by means of a clamp at the exhaust gas recirculating valve 29.

While we have shown and described only one embodiment in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A connecting line between a compressor of an exhaust gas turbocharger flangedly connected at an exhaust gas manifold of an internal combustion engine and a suction pipe, comprising a first line part secured at the suction pipe and a second line part which is coupled with the exhaust gas turbocharger and the first line part by coupling means arranged at the pipe ends to be connected with each other in an angular and axial tolerance-compensating manner, and line bridge means arranged between the first and second line part, said line bridge means being fixedly arranged at the internal combustion engine, said line bridge means including at its longitudinal pipe ends coupling sections for the separate connection of the coupling sections at both line parts, and said line bridge means being provided between the two coupling sections with a mixing space having an overflow opening for the admixture of exhaust gas to the combustion air.

2. A connecting line according to claim 1, wherein said coupling sections include pipe socket means.

3. A connecting line according to claim 1, wherein the coupling sections of the line bridge means are constructed as pipe socket means, the pipe ends of the compressor outlet and of the first line part being constructed also as pipe socket means and being disposed opposite the first-mentioned pipe socket means of the line bridge meas with an axial spacing, and the adjacent pipe socket means being coupled with each other by way of an inserted connecting sleeve means, of which the connecting sleeve means between the compressor outlet and the line bridge means forms the second line part.

4. A connecting line according to claim 3, wherein the connecting sleeve means are provided at their longitudinal ends with sealing rings which abut at the inner walls of the pipe socket means.

5. A connecting line according to claim 4, wherein the line bridge means is secured at the exhaust side longitudinal wall of the engine housing by way of a bracket means.

6. A connecting line according to claim 5, wherein the overflow opening forms the end of a hollow flange connection formed on the housing of the mixing space, on which is secured an exhaust gas recirculating valve.

7. A connecting line according to claim 6, wherein the flange connection is arranged tangentially to the mixing space and obliquely to the discharge flow direction of the charging air at the housing of the mixing space.

8. A connecting line according to claim 7, wherein starting from the compressor outlet, the line cross section of the two connecting sleeve means and of the line bridge means are constructed enlarged diffusor-like.

9. A connecting line according to claim 8, wherein the exhaust gas recirculating valve is connected by way of a flow line with a pipe connection at the exhaust gas manifold.

10. A connecting line according to claim 9, wherein the flow line is assembled of a fixed pipe section and of a bellows pipe, the fixed pipe section being secured at the pipe connection by means of a clamp and the bellows pipe being secured at the exhaust gas recirculating valve by means of a clamp.

11. A connecting line according to claim 1, wherein the line bridge means is secured at the exhaust side longitudinal wall of the engine housing by way of a bracket means.

12. A connecting line according to claim 1, wherein the overflow opening forms the end of a hollow flange connection formed on the housing of the mixing space, on which is secured an exhaust gas recirculating valve.

13. A connecting line according to claim 12, wherein the flange connection is arranged tangentially to the mixing space and obliquely to the discharge flow direction of the charging air at the housing of the mixing space.

14. A connecting line according to claim 1, wherein starting from the compressor outlet, the line cross section of the two connecting sleeve means and of the line bridge means are constructed enlarged diffusor-like.

15. A connecting line according to claim 14, wherein the exhaust gas recirculating valve is connected by way of a flow line with a pipe connection at the exhaust gas manifold.

16. A connecting line according to claim 14, wherein the flow line is assembled of a fixed pipe section and of a bellows pipe, the fixed pipe sectin being secured at the pipe connection by means of a clamp and the bellows pipe being secured at the exhaust gas recirculating valve by means of a clamp.

* * * * *